(12) United States Patent
Hall (10) Patent No.: US 10,414,275 B2
(45) Date of Patent: Sep. 17, 2019

(54) INSTRUMENT CLUSTER ARRANGEMENTS FOR VEHICLES

(71) Applicant: Toyota Motor Engineering & Manufacturing North America, Inc., Plano, TX (US)

(72) Inventor: Jonathan C. Hall, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/291,138

(22) Filed: Mar. 4, 2019

(65) Prior Publication Data

US 2019/0193561 A1 Jun. 27, 2019

Related U.S. Application Data

(62) Division of application No. 15/196,757, filed on Jun. 29, 2016.

(51) Int. Cl.
*H04M 1/00* (2006.01)
*B60K 35/00* (2006.01)
(Continued)

(52) U.S. Cl.
CPC .............. *B60K 35/00* (2013.01); *B60K 37/02* (2013.01); *H04B 1/3888* (2013.01); *H04M 1/04* (2013.01);
(Continued)

(58) Field of Classification Search
CPC ... B60K 35/00; B60K 37/02; B60K 2370/589
(Continued)

(56) References Cited

U.S. PATENT DOCUMENTS 6,771,946 B1 8/2004 Oyaski
8,496,144 B2 7/2013 Son
(Continued)

FOREIGN PATENT DOCUMENTS

| CN | 203486055 U | 3/2014 |
|---|---|---|
| CN | 103973887 A | 8/2014 |
| DE | 202014006158 U1 | 10/2014 |

OTHER PUBLICATIONS

Chris Welch, "This Honda Concept Replaces the Car's Head Unit With a Smartphone", URL: http://www.theverge.com/2016/2/23/11100652/drivemode-honda-android-phone-head-unit, published Feb. 23, 2016.

(Continued)

*Primary Examiner* — Nghi H Ly
(74) *Attorney, Agent, or Firm* — Dinsmore & Shohl LLP (57) ABSTRACT

An information display system includes a steering wheel including a ring portion and an upper opening region within the ring portion, an instrument cluster arrangement positioned forward of the steering wheel, and an electronic control unit. The instrument cluster arrangement includes a first gauge having a first fixing member on a portion of a boundary of the first gauge, and a second gauge having a second fixing member on a portion of a boundary of the second gauge. The first fixing member and the second fixing member are configured to hold a handheld device placed between the first and second gauges, and the first and second gauges are positioned such that when the handheld device is placed between the first and second gauges the handheld device is visible through the upper opening region.

20 Claims, 9 Drawing Sheets

(51) Int. Cl.
*H04M 1/725* (2006.01)
*H04B 1/3888* (2015.01)
*B60K 37/02* (2006.01)
*H04M 1/04* (2006.01)
*H04M 1/60* (2006.01)

(52) U.S. Cl.
CPC ... *H04M 1/72527* (2013.01); *H04M 1/72577* (2013.01); *B60K 2370/589* (2019.05); *B60K 2370/834* (2019.05); *H04M 1/6083* (2013.01)

(58) Field of Classification Search
USPC .............. 455/575.1, 419, 423, 550.1, 569.2
See application file for complete search history.

(56) References Cited

U.S. PATENT DOCUMENTS

| | | | |
|---|---|---|---|
| 8,914,187 | B2 | 12/2014 | Wang et al. |
| 8,991,670 | B2* | 3/2015 | Matsuoka ............ F16M 11/041 224/276 |
| 9,469,195 | B1* | 10/2016 | Boss ...................... B60K 35/00 |
| 2011/0263293 | A1 | 10/2011 | Blake et al. |
| 2012/0205412 | A1 | 8/2012 | Choi |
| 2013/0190978 | A1 | 7/2013 | Kato et al. |
| 2013/0295908 | A1 | 11/2013 | Zeinstra et al. |
| 2013/0344856 | A1 | 12/2013 | Silver et al. |
| 2014/0125583 | A1* | 5/2014 | Aoki ...................... B60K 37/02 345/156 |
| 2014/0128049 | A1 | 5/2014 | Aoki et al. |
| 2014/0358376 | A1 | 12/2014 | Phelan |
| 2015/0014380 | A1 | 1/2015 | Oyama et al. |
| 2015/0120089 | A1* | 4/2015 | Peel ......................... B60T 7/16 701/2 |
| 2015/0172432 | A1 | 6/2015 | An et al. |
| 2015/0223064 | A1 | 8/2015 | Takemura et al. |
| 2016/0218553 | A1 | 7/2016 | He et al. |

OTHER PUBLICATIONS

Jonathan Hawley, "Smartphone-Inspired Instruments for Luxury", URL: http://www.drive.com.au/motor-news/smartphoneinspired-instruments-for-luxury-cars-20140311-34lb9.html, published Mar. 12, 2014.

* cited by examiner

INSTRUMENT CLUSTER ARRANGEMENTS FOR VEHICLES

CROSS-REFERENCE TO RELATED APPLICATIONS

This application is a divisional application of U.S. patent application Ser. No. 15/196,757 filed on Jun. 29, 2016, the entirety of which is hereby incorporated by reference.

TECHNICAL FIELD

The present specification generally relates to instrument cluster arrangements for vehicles and, more specifically, to instrument cluster arrangements with a holder for receiving a handheld device.

BACKGROUND

Vehicle drivers often operate handheld devices, such as a cell phones or the like, while driving. The operation of a handheld device while driving may cause driver distraction. For example, a driver may manipulate a handheld device to view the screen of the device. Alternatively, the driver may place the handheld device in a cup holder or other location to enable frequent observation of the screen of the device while driving. In either case, observation of the screen of the handheld device may cause intermittent driver distraction by diverting the attention of the driver from the road.

Accordingly, a need exists for alternative instrument cluster arrangements for vehicles which include a holder for a mobile device such as a cell phone.

SUMMARY

In one embodiment, an information display system for a vehicle is provided. The information display system includes a steering wheel including a ring portion and an upper opening region within the ring portion, an instrument cluster arrangement positioned forward of the steering wheel, and an electronic control unit including one or more processors and a non-transitory memory storing computer readable and executable instructions which, when executed by the processors, cause the electronic control unit to communicate with a handheld device to display information associated with the vehicle on the handheld device. The instrument cluster arrangement includes a first gauge having a first fixing member on a portion of a boundary of the first gauge, and a second gauge having a second fixing member on a portion of a boundary of the second gauge. The first fixing member and the second fixing member are configured to hold a handheld device placed between the first and second gauges, and the first and second gauges are positioned such that when the handheld device is placed between the first and second gauges the handheld device is visible through the upper opening region.

According to another embodiment, a vehicle is provided. The vehicle includes a steering wheel comprising a ring portion and a upper opening region, and an instrument cluster arrangement positioned forward of the steering wheel and comprising: a first gauge having a first fixing member on a portion of a boundary of the first gauge; and a second gauge having a second fixing member on a portion of a boundary of the second gauge. The first fixing member and the second fixing member are configured to hold a handheld device placed between the first and second gauges, and the first and second gauges are positioned such that when the handheld device is placed between the first and second gauges the handheld device is visible through the upper opening region.

In embodiments, the steering wheel may include one or more operator controls for sending an instruction to the handheld device through the electronic control unit. The one or more operator controls is communicatively coupled to the electronic control unit. The electronic control unit may send a signal for changing a display mode of the handheld device in response to one of the one or more operator controls being pushed. The holder may include an adjustable arm for adjusting an orientation. The electronic control unit may communicate with the handheld device via Bluetooth, near field communication (NFC), Wi-Fi or a USB connection. The electronic control unit may start communicating with the handheld device when the instrument cluster arrangement detects a presence of the handheld device. The electronic control unit may send an instruction for operating an application on the handheld device to display the information associated with the vehicle. The engine control unit may send a signal for disabling a predetermined application on the handheld device when the instrument cluster arrangement detects a present of the handheld device.

In embodiments, the instrument cluster arrangement may include a sensor detecting a presence of the handheld device based on a signal from the sensor. The sensor may be a proximate sensor or a weight sensor. The positions of the one or more gauges may be adjustable. The information associated with the vehicle comprises at least one of information on fuel economy, information on speed limit, navigational information, and audio streaming information. The instrument cluster arrangement may include a charger for charging the handheld device wirelessly when the holder receives the handheld device.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
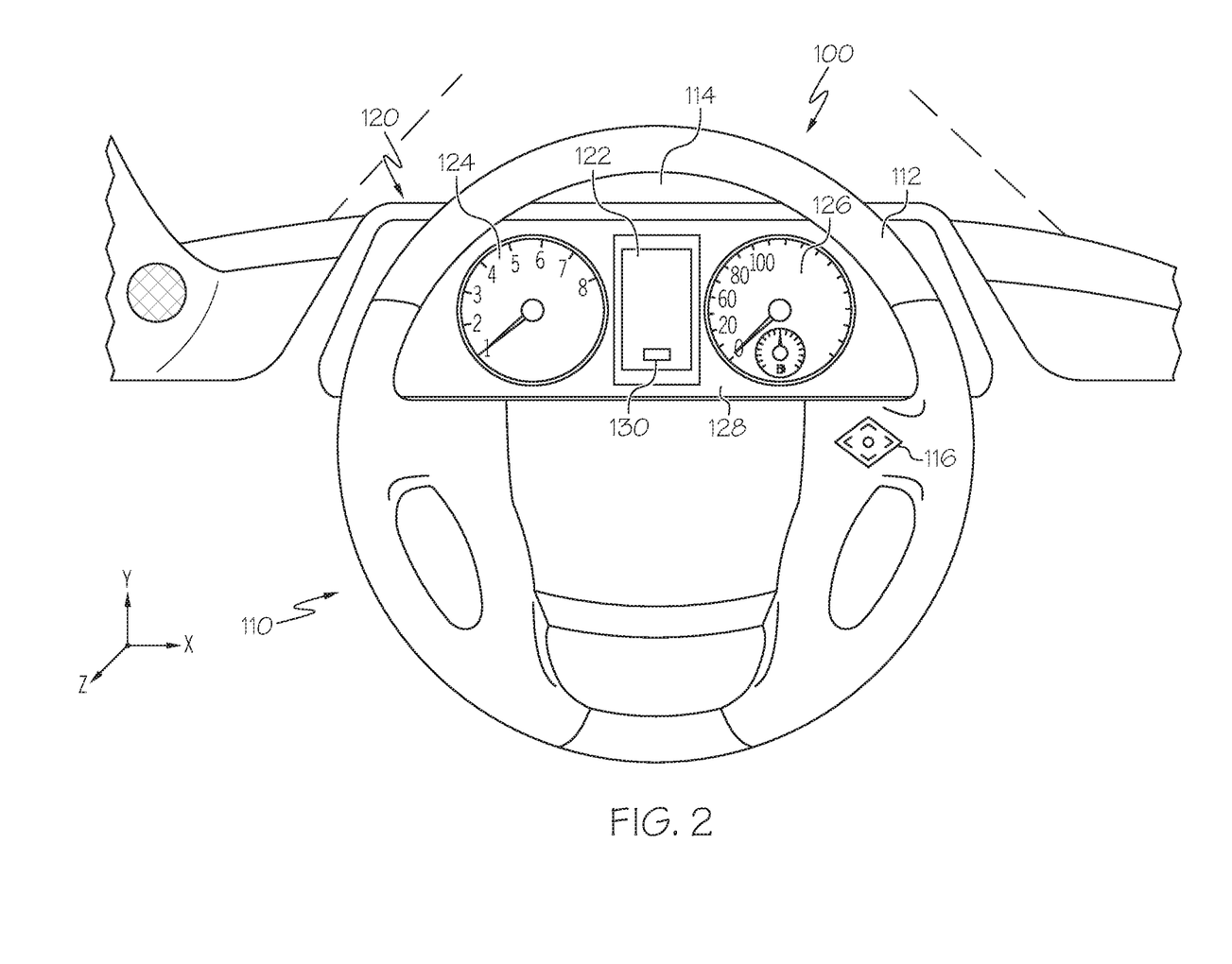
FIG. 2 schematically depicts one embodiment of the information display system for a vehicle viewed from a driver's seat of the vehicle according to one or more embodiments shown and described herein.

FIG. 2 generally depicts one embodiment of an information display system for a vehicle. The information display system may be used to display driving metric information using a combination of vehicle gauges and the screen of a handheld device. The information display system may include a steering wheel, an instrument cluster arrangement including one or more gauges, a holder configured to receive a handheld device, and an electronic control unit configured to communicate with the handheld device to display information associated with the vehicle on the handheld device. Various embodiments of information display systems for vehicles and vehicles comprising the same will be described in further detail herein with specific reference to the appended drawings.

Figure 1:
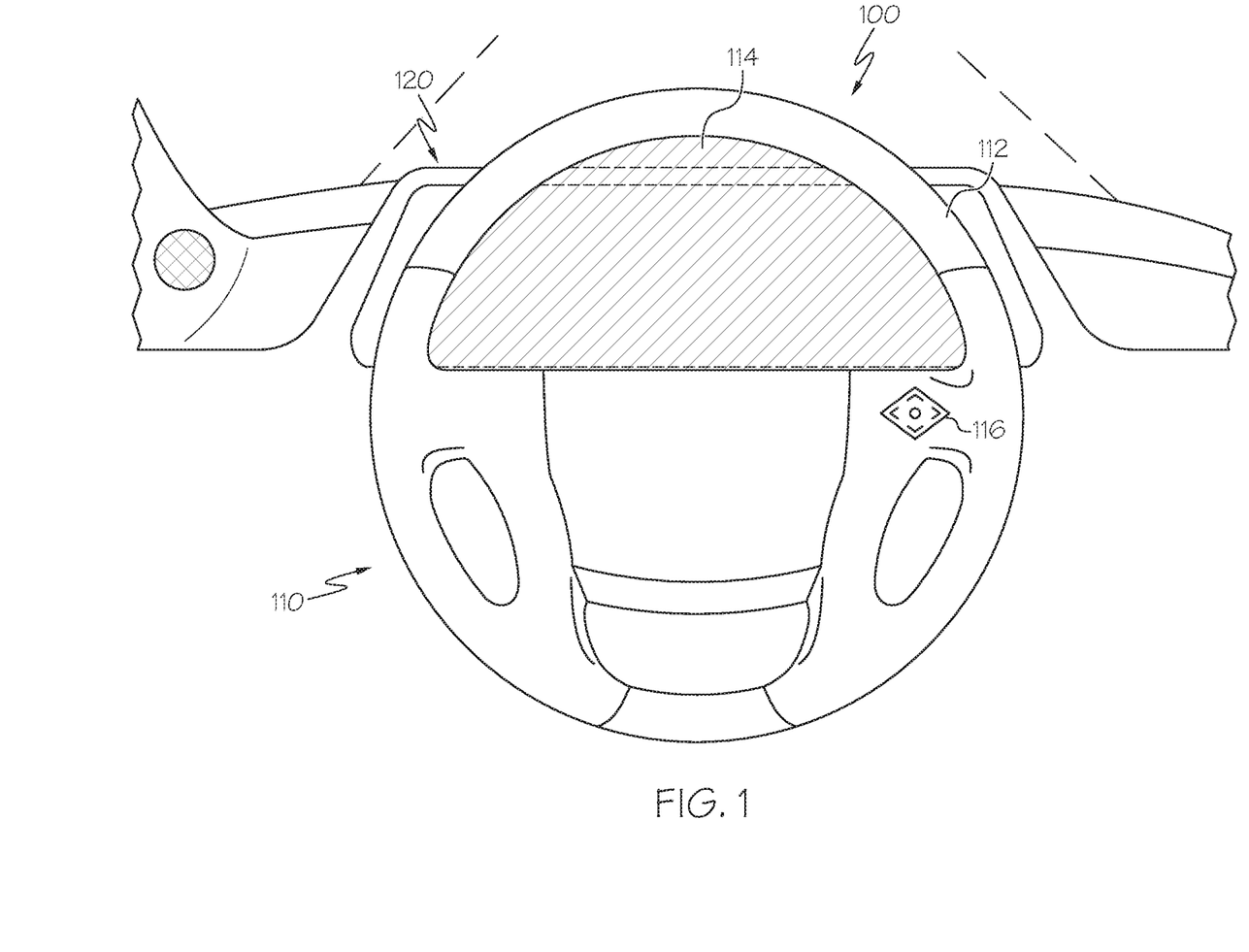
FIG. 1 schematically depicts an information display system for a vehicle viewed from a driver's seat of the vehicle.

FIG. 1 schematically depicts one embodiment of an information display system 100 for a vehicle viewed from a driver's seat of the vehicle. The information display system 100 includes a steering wheel 110 and an instrument cluster arrangement 120. The steering wheel 110 may include a ring portion 112, an upper opening region 114, and one or more operator controls 116 such as buttons, switches, or the like. When an operator is driving the vehicle, the operator views the instrument cluster arrangement 120 through the upper opening region 114 of the steering wheel 110 to check a speed of the vehicle or any other information related to the operation of the vehicle including, without limitation, fuel level, engine RPM, etc. The operator is not generally distracted from driving when viewing the instrument cluster arrangement 120 through the upper opening region 114 because the upper opening region 114 is located directly in front of the operator and slightly below the operator's view through the windshield of the vehicle from the operator's perspective. Thus, important vehicle information (e.g., speed, fuel level, etc.) is usually displayed on the portion of the instrument cluster arrangement 120 which is visible through the upper opening region 114. Further details of the instrument cluster arrangement 120 are described below with reference to FIG. 2.

Referring now to FIG. 2, one embodiment of the information display system 100 for a vehicle viewed from a driver's seat of the vehicle is schematically depicted. As described above, the information display system 100 includes the steering wheel 110 and the instrument cluster arrangement 120. The steering wheel 110 may include the ring portion 112, the upper opening region 114 and one or more operator controls 116. In the embodiments described herein, the instrument cluster arrangement 120 may include a holder 122 for receiving and retaining a handheld electronic device, a first gauge 124, a second gauge 126, a trim plate 128, and a sensor 130. The handheld device may include, without limitation, a smartphone, a tablet, a personal media player, or any other electric device having a small display that may fit inside the instrument cluster arrangement 120. As illustrated in FIG. 2, the holder 122, and the first and second gauges 124 and 126 are positioned such that they are visible to an operator of the vehicle through the upper opening region 114. In one embodiment, the whole of the first gauge 124 and the second gauge 126 may be visible to the operator through the upper opening region 114. In some embodiments, a portion of the first gauge 124 and the second gauge 126 may be blocked from the operator's view by the ring portion 112. In embodiments, the positions of the first gauge 124 and the second gauge 126 may be adjustable laterally such that when the portion of the first gauge 124 and the second gauge 126 is blocked from view by the ring portion 112, the first gauge 124 and the second gauge 126 may be moved toward each other such that they are visible through the upper opening region 114.

FIG. 2 illustrates x, y, z orthogonal coordinate axes. The x axis and the y axis are parallel to the plane of the trim plate 128 and the z axis is perpendicular to the trim plate 128. The terms "top" and "bottom" are defined in terms of the y axis, and the term "lateral" is defined in terms of the x axis (i.e., lateral direction is parallel to the x axis). In one embodiment, the holder 122 may be a structure recessed from the trim plate 128 (i.e., in the direction of negative z axis). For example, the holder 122 may be a recessed rectangular box such that a handheld device can be placed inside the box. In another example, the holder 122 may be a support extending from the trim plate 128 (i.e., in the direction of positive z axis). The support may include a bottom portion to support the bottom of a handheld device and lateral portions to limit the lateral movement of the handheld device when placed on the holder 122. The rectangular box or support may be suitably shaped such that a handheld device, such as a smart phone, may be placed therein in a portrait orientation. Alternatively, the rectangular box or support may be suitably shaped such that a handheld device may be placed therein in a landscape orientation. In other embodiments, the holder 122 may include adjustable arms to secure a handheld device placed therein. Additional details of the adjustable arms will be described in further detail herein with specific reference to FIGS. 5 and 6 below.

In another embodiment, the first gauge 124 and the second gauge 126 may operate together as a holder for holding the handheld electronic device by adjusting the positions of the first gauge 124 and the second gauge 126 relative to one another, as will be described in further detail herein with reference to FIG. 7. When a handheld device is placed on or in the holder 122, the entire display screen of the handheld device may be visible to the operator through the upper opening region 114 of the steering wheel 110. In embodiments, the dimension of the holder 122 may be variable such that the holder 122 can receive and hold handheld devices of different sizes.

The first gauge 124 and the second gauge 126 may be any one of various gauges including, but not limited to, a speedometer, tachometer, headlight indicator, oil pressure gauge, air pressure gauge (primary and secondary), fuel gauge, temperature gauge, voltmeter, turn signal indicator, cruise control indicator, fuel economy indicator, and a navigation indicator, among others. The holder 122 may be positioned between the first gauge 124 and the second gauge 126. Although FIG. 2 illustrates two gauges, the number of gauges on the instrument cluster arrangement 120 is not limited thereto. For example, in embodiments, only one gauge may be positioned on the instrument cluster arrangement 120. In this example, the holder 122 may be placed next to the gauge, and a handheld device placed on or in the holder 122 may be visible to the operator through the upper opening region 114 of the steering wheel 110. Alternatively, three or more gauges may be placed on the instrument cluster arrangement 120. In this example, the holder 122 may be placed anywhere between two of the gauges such that a handheld device placed on or in the holder 122 is visible to the operator through the upper opening region 114 of the steering wheel 110.

Still referring to FIG. 2, the sensor 130 may be a sensor for detecting a presence of a handheld device proximate to the holder 122. In one embodiment, the sensor 130 may be a weight sensor located under the holder 122. The weight sensor detects the weight of an object placed on the holder 122 and communicates the weight information to an electronic control unit of the vehicle. The weight sensor may be any device capable of outputting a weight signal indicative of a weight of an object sensed by the weight sensor. In some embodiments, the weight sensor may comprise a load sensor, a force sensor, a weight pressure sensor, a mass sensor, or the like. In some embodiments, the weight sensor may be configured to determine the weight of an object on or in the holder 122. In some embodiments, a multimedia electronic control unit (ECU) of the vehicle may be able to determine one or more characteristics of the object on the holder 122, such as, for example, the weight of the object based on a weight signal outputted by the weight sensor. When the electronic control unit determines that the handheld device is positioned in the holder 122, it may send information related to the operation of the vehicle to the handheld device such that the handheld device can display the metric information on its screen.

In an alternative embodiment, the sensor 130 may be a proximity sensor located near the holder 122. The proximity sensor detects a distance between the sensor and an object nearby and communicates the proximity information to the electronic control unit of the vehicle. The proximity sensor may be any device capable of outputting a proximity signal indicative of a proximity of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like. In some embodiments, the information display system 100 may be configured to determine the presence of an object on the holder 122 based on an output signal from the proximity sensor. In some embodiments, the information display system 100 may be able to determine one or more characteristics of an object on the holder 122, such as, for example, the dimensions of the object (height, width, diameter, or the like) based on a proximity signal from the proximity sensor. The electronic control unit of the vehicle may determine whether an object is placed on the holder 122 based on the data received from the sensor 130. When the electronic control unit determines that the handheld device is positioned in the holder, it may send information related to the operation of the vehicle to the handheld device such that the handheld device can display the metric information on its screen.

In another embodiment, instead of using the sensor 130, the electronic control unit of the vehicle may receive a wireless signal from a handheld device, such as a Bluetooth signal or a Near Field Communication (NFC) signal, and determine that the handheld device is located within a certain distance from the vehicle. When the electronic control unit determines that the handheld device is located within a certain distance from the vehicle, it may send information related to the operation of the vehicle to the handheld device such that the handheld device can display the metric information on its screen.

Figure 3:
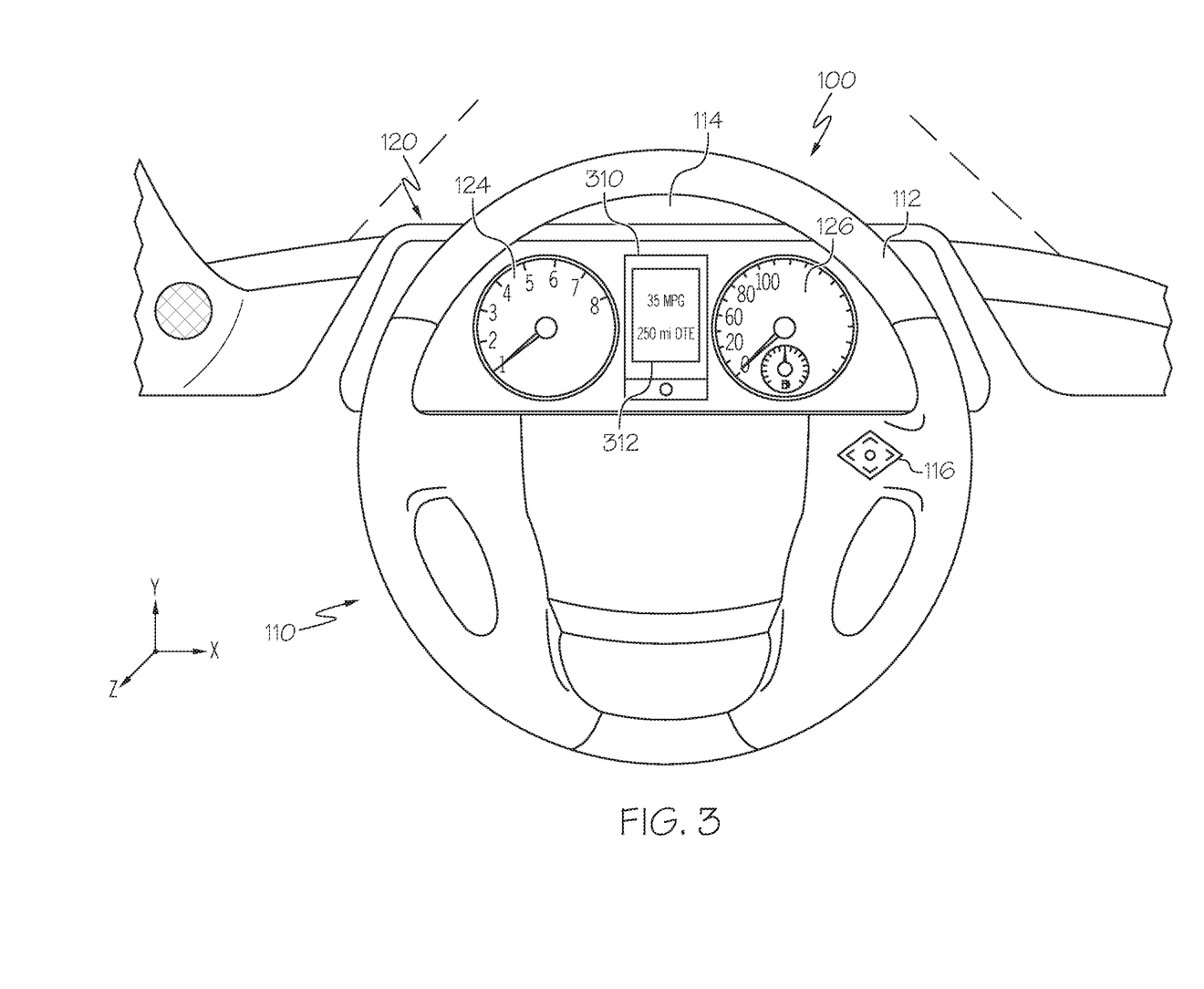
FIG. 3 schematically depicts one embodiment of an instrument cluster arrangement with a handheld device placed thereon according to one or more embodiments shown and described herein.

FIG. 3 depicts one embodiment of instrument cluster arrangement 120 with a handheld device placed thereon. As described above, the instrument cluster arrangement 120 may include the first gauge 124 and the second gauge 126. In this embodiment, a handheld device 310, such as a smartphone, is placed on the holder (not shown) between the first gauge 124 and the second gauge 126. As shown in FIG. 3, all of the first and second gauges 124 and 126 and the handheld device 310 may be visible to an operator of the vehicle through the upper opening region 114 when the handheld device 310 is positioned in or on the holder.

The handheld device 310 may communicate with the electronic control unit of the vehicle and receive information related to the operation of the vehicle, which will be described further in detail with reference to FIG. 4 below. In the embodiments described herein, the handheld device 310 includes a display screen 312 which may display the received information related to the operation of the vehicle including, but not limited, speed information, fuel gauge information, headlight indicator information, oil pressure information, air pressure information, voltmeter information, turn signal indicator information, cruise control indicator information, fuel economy information, outside temperature information, navigation information, fuel economy information, speed limit information, and information on media being played. For example, the handheld device 310 may store application program for displaying the above-mentioned information on the display screen 312 and run the application program when placed on the holder.

Because the display screen 312 of the handheld device 310 may replace a portion of the interface of vehicle dashboard, the dashboard does not need to include a separate display screen, e.g., an LCD display screen for showing metric information, and the design of the dashboard can be simplified. Accordingly, the cost of manufacturing the dashboard may be reduced substantially.

The handheld device 310 positioned on the holder may display various combinations of different information. For example, as shown in FIG. 3, the handheld device 310 may display fuel economy information with a current mile per gallon (MPG) and miles to empty. In another example, the handheld device 310 may display a speed of the vehicle, such as "63 mph," and/or a tachometer engine speed of, for example, "1200 rpm." The information displayed on the display screen 312 may be changed to a different set of information when one of the operator controls 116 is pushed. For example, the operator may push the left or right arrow key of the operator controls 116 to display a different set of information on the screen of the handheld device 310. In embodiments, the type and location of information displayed on the handheld device 310 may be configurable by the user.

Figure 4:
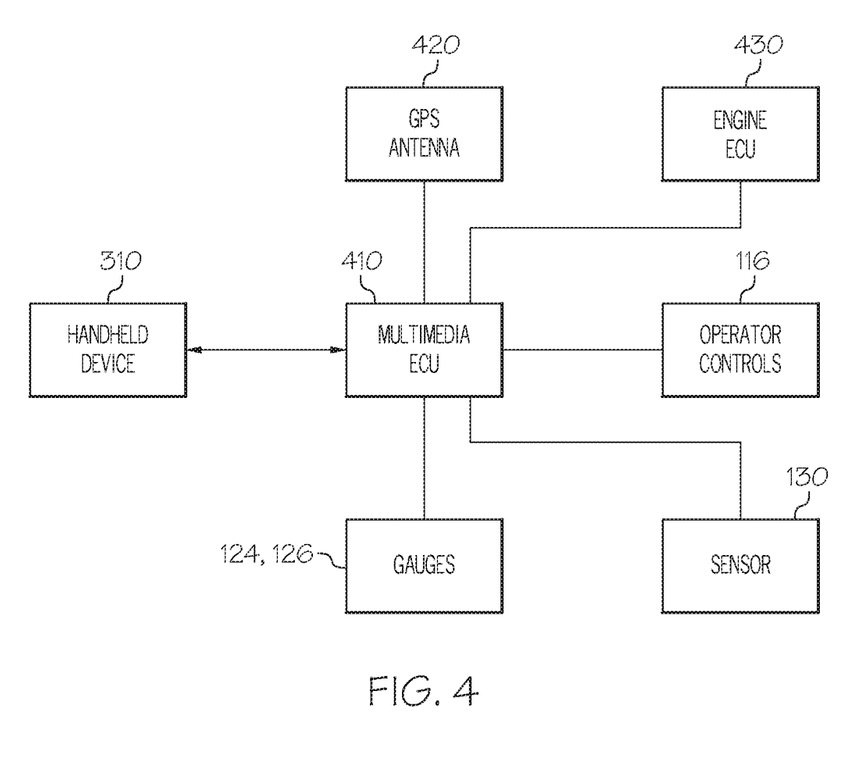
FIG. 4 schematically depicts the interconnectivity of various components of an information display system for a vehicle according to one or more embodiments shown and described herein.

FIG. 4 schematically depicts the interconnectivity of various components of the information display system 100 of the vehicle. In addition to the operator controls 116, the first and second gauges 124, 126, the sensor 130, and the handheld device 310, the information display system 400 may further include a multimedia electronic control unit (ECU) 410, a GPS antenna 420, and an engine ECU 430. The various components may be interconnected by wire or wirelessly. The multimedia ECU 410 may include one or more processors and a non-transitory memory storing computer readable and executable instructions which, when executed by the processors, causes the multimedia ECU 410 to perform determining whether the handheld device 310 is placed on the holder, collecting metric information on the vehicle from the engine ECU 430, transmitting information related to the operation of the vehicle to the handheld device 310, sending a signal for restricting functions of the handheld device 310, communicating with operator controls 116, communicating with the sensor 130, receiving the current location of the vehicle from the GPS antenna 420, etc.

The multimedia ECU 410 may collect metric information on the vehicle from various components of the vehicle, for example, the engine ECU 430, and send the metric information to the gauges 124 and 126, which then display the metric information accordingly. As described above, the multimedia ECU 410 may receive data from the sensor 130. Based on the data from the sensor 130, the multimedia ECU 410 may determine whether a handheld device is placed on the holder 122. If it is determined that a handheld device is placed on the holder 122, the multimedia ECU 410 may begin communication with the handheld device 310 and send the metric information to the handheld device 310. The handheld device 310 may display the metric information on the display screen 312 when it receives the metric information from the handheld device 310.

In one embodiment, the handheld device 310 may store application programs for displaying metric information of the vehicle. The multimedia ECU 410 may send a signal for running the application to the handheld device 310 when it is determined that the handheld device 310 is placed on the holder 122. In response, the application may be opened in the handheld device 310. Alternatively, a pop-up message asking whether or not the application should be run may be displayed on the display screen 312, allowing the operator to choose if the application should be run. The application program may display the metric information in a predefined format or a customized format defined by the operator of the vehicle.

The multimedia ECU 410 may communicate with the handheld device 310 through various communication protocols. In one embodiment, the multimedia ECU 410 may communicate with the handheld device 310 through a personal area network that utilizes Bluetooth technology. In other embodiments, the multimedia ECU 410 may communicate with the handheld device 310 through one or more computer networks (e.g., a personal area network, a local area network, or a wide area network), cellular networks, satellite networks and/or a global positioning system and combinations thereof. Accordingly, the multimedia ECU 410 can be communicatively coupled to the handheld device 310 via wires, or wirelessly via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In embodiments, when the multimedia ECU 410 determines that the handheld device 310 is placed on the holder 122 based on a signal from the sensor 130, it may send a signal for restricting functions of the handheld device 310 other than running the application program for displaying vehicle metrics discussed above. That is, the multimedia ECU 410 may send a signal for restricting other applications of the handheld device from operating. For example, any application that may possibly distract an operator of the vehicle, such as a social media application, may be disabled when the handheld device 310 receives the restricting signal from the multimedia ECU 410. Alternatively, application programs that are to be restricted may be set by the operator of the vehicle. In one embodiment, notifications from other application programs, such as a text message, social media applications, email notifications, etc., may be restricted from being displayed on the handheld device 310 when the handheld device 310 receives the restricting signal from the multimedia ECU 410. In some embodiments, the multimedia ECU 410 may send a signal for restricting other applications to the handheld device 310 when it determines that the engine of the vehicle is turned on. In other embodiments, the multimedia ECU 410 may send a signal for restricting other applications to the handheld device 310 when it determines that the engine of the vehicle is turned on and the transmission of the vehicle is not in "Park" (i.e., the transmission of the vehicle is in a forward driving or reverse driving gear). In some other embodiments, the multimedia ECU 410 may send a signal for restricting other applications to the handheld device 310 when it determines that the vehicle starts driving based on the collected metric information.

In some embodiments, the multimedia ECU 410 may send a signal for withdrawing the restriction when it is determined that the speed of the vehicle becomes zero. For example, when the vehicle stops at a red light, the multimedia ECU 410 may send a signal for withdrawing the restriction, so that the handheld device can display the withheld notifications, such as text messages, social media messages, email notifications, etc. Once the vehicle starts driving again (i.e., once the vehicle speed is non-zero), the multimedia ECU 410 may send a signal for resuming the restriction of the handheld device 310. In another embodiment, the multimedia ECU 410 may send a signal for withdrawing the restriction when it is determined that the transmission of the vehicle is in park. In another embodiment, the multimedia ECU 410 may send a signal for withdrawing the restriction when it is determined that the speed of the vehicle is less than a certain value. In another embodiment, the multimedia ECU 410 may send a signal for withdrawing the restriction when it is determined that the engine is turned off.

The multimedia ECU 410 may communicate with the handheld device 310 wirelessly or through a wired connection. For example, the multimedia ECU 410 may use Bluetooth, Wi-Fi, or near filed communication (NFC) to communicate with the handheld device. In another example, the multimedia ECU 410 may be connected with the handheld device 310 through a USB connection. The USB connection may provide more bandwidth than the wireless connection, such that it may be used when communicating a large volume of data, for example, video data.

The multimedia ECU 410 may also communicate with the operator controls 116. For example, the multimedia ECU 410 may receive a signal indicating that one of the operator controls 116 has been actuated. In response to the received signal, the multimedia ECU 410 sends a corresponding instruction to the handheld device 310. In embodiments, when a left or right arrow key of the operator controls 116 is pushed, the multimedia ECU 410 sends an instruction that changes the information displayed on the handheld device 310. For example, the speed information displayed on the handheld device 310 may be switched to fuel economy information in response to the push of the left arrow key. In other embodiment, the operator controls 116 may directly communicate with the handheld device 310 via Bluetooth without the multimedia ECU 410 as an intermediary.

In embodiments, the multimedia ECU 410 may also communicate with the GPS antenna 420 to receive the current location information of the vehicle. The GPS antenna 420 may be placed on the vehicle to communicate the current location of the vehicle with a GPS satellite. The current location information received from the GPS antenna 420 may be communicated to the handheld device 310, and the handheld device 310 may display navigational information based on the received location information.

Figure 5A:
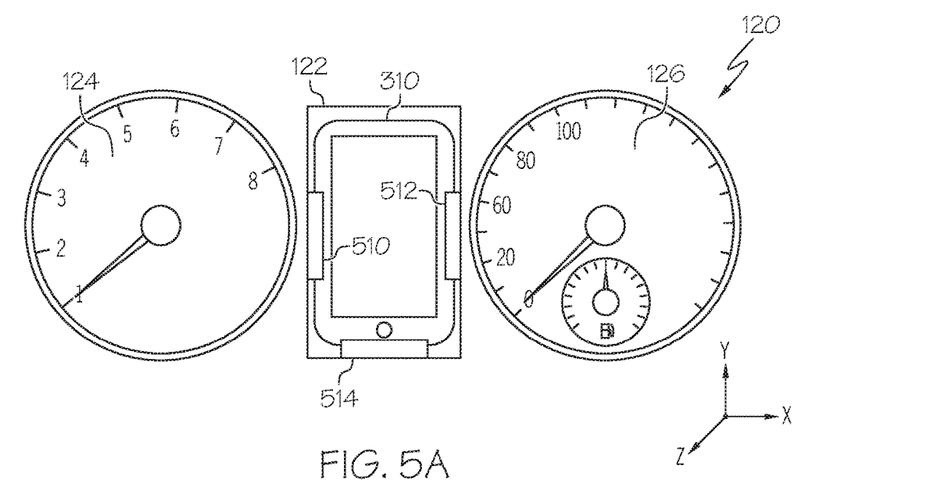
FIG. 5A schematically depicts an instrument cluster arrangement according to one or more embodiments shown and described herein.
Figure 5B:
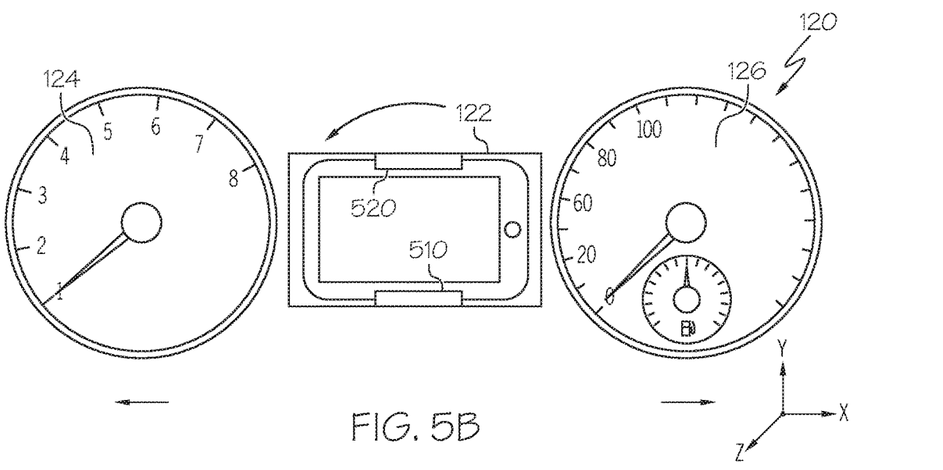
FIG. 5B schematically depicts an instrument cluster arrangement according to one or more embodiments shown and described herein.

FIGS. 5A-5B schematically depict the instrument cluster arrangement 120 in accordance with one or more embodiments of the present disclosure. The x, y, z coordinates shown in FIGS. 5A and 5B may be the same coordinates as shown in FIGS. 2 and 3. As shown in FIG. 5A, the instrument cluster arrangement 120 may include the holder 122 and the first gauge 124 and the second gauge 126. In this embodiment, the holder 122 may include two arms 510 and 512 to hold the handheld device 310. The two arms 510 and 512 are adjustable in a lateral direction (i.e., in a direction parallel to the x axis direction of the x, y, z coordinates shown in FIG. 5A) such that the arms can securely hold different sized handheld devices. In embodiments, the arms 510, 512 may be, for example, "L" shaped brackets extending from the holder 122. The holder 122 may further include a support 514 to support the bottom of the handheld device 310. Like the arms 510, 512, the support 514 may be, for example, an "L" shaped bracket extending from the holder 122. In embodiments, the holder 122 may be rotatable in a clockwise and/or counterclockwise direction such that the handheld device 310 thereon may be placed in either a landscape or a portrait orientation. In embodiments, the positions of the first gauge 124 and the second gauge 126 may be adjustable in a horizontal direction. For example, the first gauge 124 and the second gauge 126 may be manually adjustable. As another example, the first gauge 124 and the second gauge 126 may be automatically adjustable, such as by using a drive motor or the like.

Referring to FIG. 5B, the position of the first gauge 124 may be adjusted toward the left (i.e., in the direction of negative x axis) and the position of the second gauge 126 may be adjusted toward right (i.e., in the direction of positive x axis) such that the distance between the first gauge 124 and the second gauge 126 is increased. The increased spacing allows the holder 122 to be rotated 90 degrees counterclockwise or clockwise such that the handheld device 310 on the holder 122 is in a landscape orientation rather than a portrait orientation. As another example, a handheld device with a bigger screen may be placed in a portrait orientation between the first and second gauges 124 and 126 when the first gauge 124 and the second gauge 126 are spaced apart.

Figure 6A:
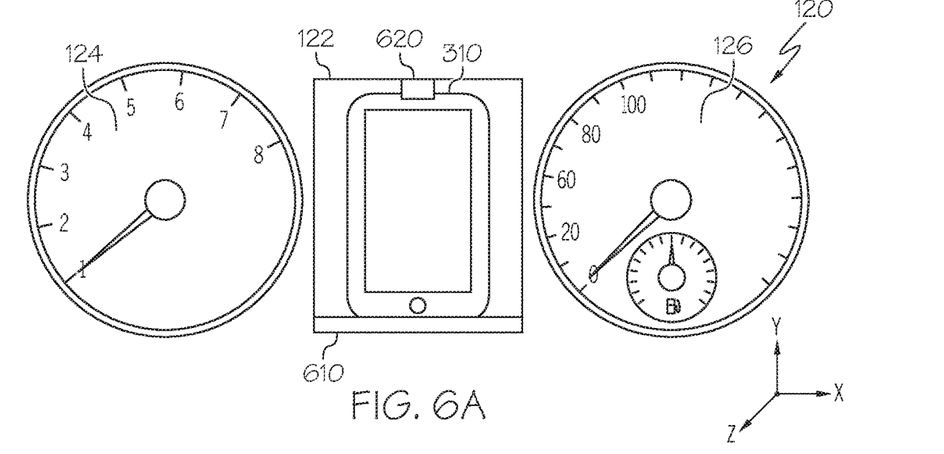
FIG. 6A schematically depicts an instrument cluster arrangement according to one or more embodiments shown and described herein.

Referring now to FIG. 6A, an embodiment of the instrument cluster arrangement 120 is schematically depicted in accordance with another embodiment of the present disclosure. As shown in FIG. 6A, the instrument cluster arrangement 120 may include the holder 122 and the first gauge 124 and the second gauge 126. The holder 122 may include an arm 620 and a support 610. The arm 620 is located at the upper part of the holder 122 and the position of the arm 620 is adjustable vertically, such as when the arm 620 is slidably engaged with a guide, such as a slot, formed in the holder 122. The support 610 is located at the bottom of the holder 122 and extends vertically from the plate of the holder 122 to a certain degree, e.g., about a half inch, to support the bottom of the handheld device 310.

Figure 6B:
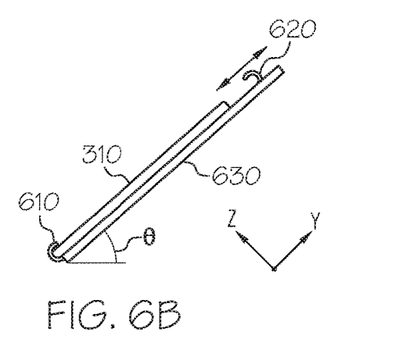
FIG. 6B schematically depicts a side view of a holder on the instrument cluster arrangement according to one or more embodiments shown and described herein.
Figure 6C:
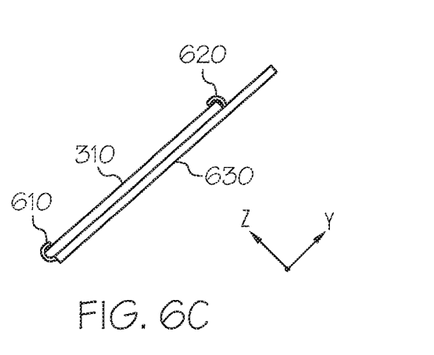
FIG. 6C schematically depicts a side view of a holder on the instrument cluster arrangement according to one or more embodiments shown and described herein.

A side view of the holder 122 of FIG. 6A is depicted in FIGS. 6B and 6C. The holder 122 may include a bottom plate 630. The bottom plate 630 may be inclined by an angle θ with respect to horizontal (i.e., the x-z plane of the coordinate axes depicted in FIGS. 6B and 6C and parallel to the y axis such that when the operator puts the handheld device 310 on the holder 122, it slides down the bottom plate 630 to the support 610. Then, the arm 620 is adjusted toward the handheld device 310 until it engages with the top portion of the handheld device 310. In embodiments, the support 610 may have an L-shape or, alternatively, a curved shape as depicted in FIG. 6B, to secure the bottom of the handheld device 310. The arm 620 may also have an L-shape or a curved shape to secure the top of the handheld device 310. However, the shape of the support 610 or the arm 620 is not limited herein, and it can be any shape suitable for holding the handheld device 310. In embodiments, the inner surface of the support 610 and the arm 620 may be made of a resilient, flexible material, e.g., rubber, urethane foam, etc., to prevent damage to the handheld device 310 when it is fixed between the support 610 and the arm 620.

Figure 6D:
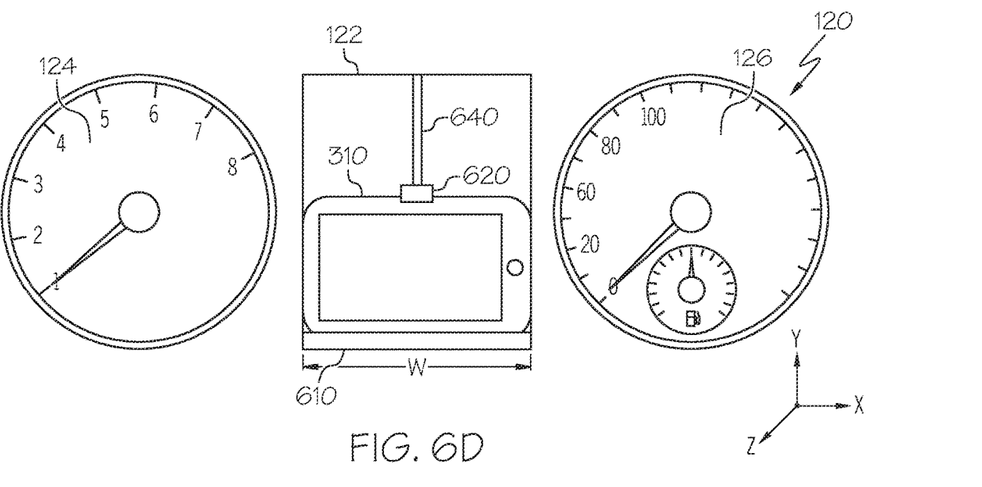
FIG. 6D schematically depicts an instrument cluster arrangement according to one or more embodiments shown and described herein.

FIG. 6D schematically depicts an instrument cluster arrangement in accordance with another embodiment of the present disclosure. As shown in FIG. 6D, the handheld device 310 may be placed in a horizontal orientation between the support 610 and the arm 620. In this example, the position of the arm 620 is lowered such that the handheld device 310 is securely held between the support 610 and the arm 620. The arm 620 may be disposed in a guide 640, such as a slot, formed in the holder 122. The arm 620 may be slidable vertically along the guide 640. The width W of the support 610 may be determined based on the dimensions of various handheld devices ranging from a small handheld device (e.g., a smart watch) to a large handheld device (e.g., a phablet or tablet).

Figure 7A:
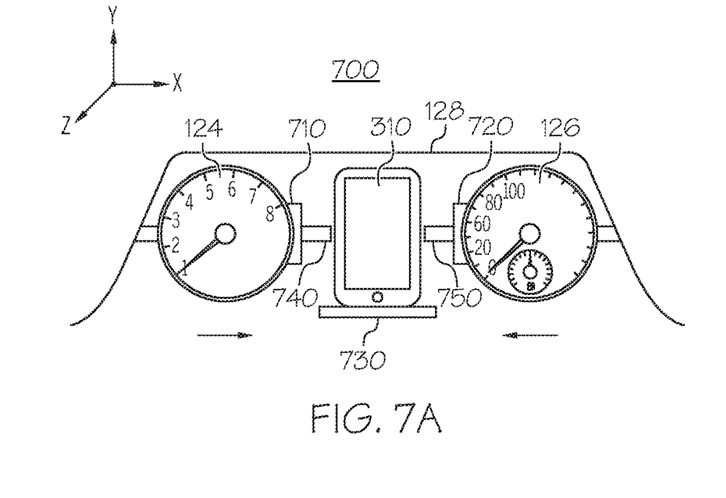
FIG. 7A schematically depicts an instrument cluster arrangement according to one or more embodiments shown and described herein.

FIGS. 7A-7D schematically depict another embodiment of the instrument cluster. Specifically, FIG. 7A depicts a front view of the instrument cluster arrangement 700. As shown in FIG. 7A, the instrument cluster arrangement 700 may include a first gauge 124, a second gauge 126, a trim plate 128, a support 730, a first guide 740, and a second guide 750. The first guide 740 and the second guide 750 may be slots formed in or on the trim plate 128. The first gauge 124 and the second gauge 126 may be slidable laterally (i.e., in a direction parallel to the x-direction) along the first guide 740 and the second guide 750 respectively.

Figure 7B:
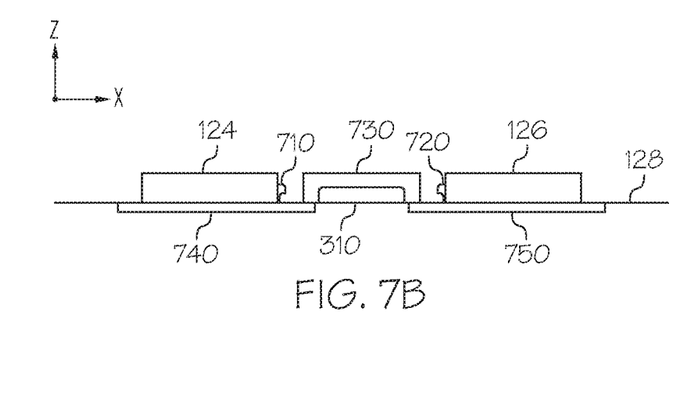
FIG. 7B schematically depicts a top view of the instrument cluster arrangement according to one or more embodiments shown and described herein.

FIG. 7B depicts a top view of the instrument cluster arrangement 700 shown in FIG. 7A. As shown in FIG. 7B, the first gauge 124 and the second gauge 126 are positioned on the trim plate 128. A first fixing member 710 may be coupled to the right surface of the first gauge 124 (i.e., the surface facing the positive x axis direction) and a second fixing member 720 may be coupled to the left surface of the second gauge 126 (i.e., the surface facing the negative x axis direction). The first fixing member 710 and the second fixing member 720 may be made of resilient, flexible material, e.g., rubber or urethane foam, to prevent damage to the handheld device due to contact with the first fixing member 710 and the second fixing member 720. In embodiments, the support 730 may be a bar shaped support that extends from the trim plate 128 and supports the bottom of the handheld device 310 placed thereon.

Figure 7C:
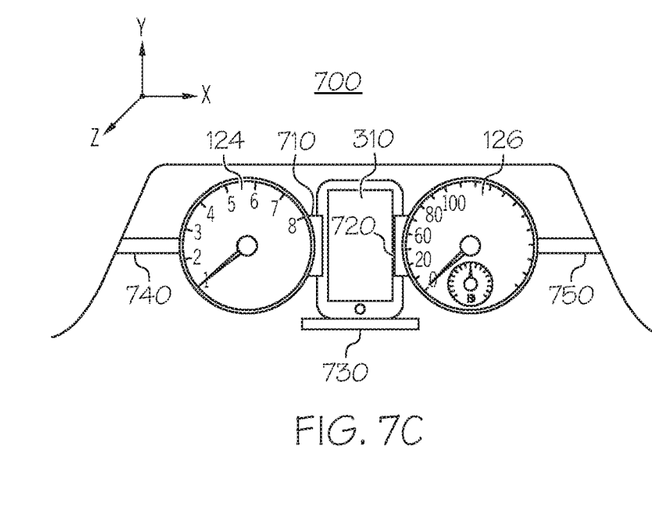
FIG. 7C schematically depicts an instrument cluster arrangement according to one or more embodiments shown and described herein.
Figure 7D:
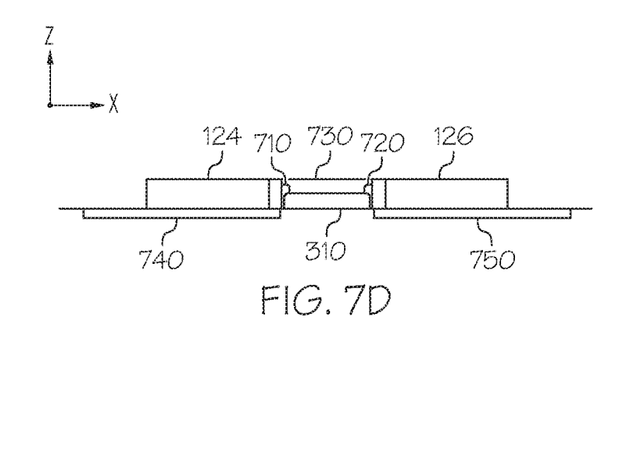
FIG. 7D schematically depicts a top view of the instrument cluster arrangement according to one or more embodiments shown and described herein.

FIG. 7C depicts a front view of the instrument cluster arrangement 700 with the first gauge 124 and the second gauge 126 impinging a handheld device 310. The first gauge 124 and the second gauge 126 are fixed at positions where the first fixing member 710 and the second fixing member 720 apply pressure on the sides of the handheld device 310. As discussed above, the positions of the first gauge 124 and the second gauge 126 may be adjusted manually or automatically. FIG. 7D is a top view of the instrument cluster arrangement 700 shown in FIG. 7C. As shown in FIG. 7D, the handheld device 310 is fixed by the first fixing member 710 and the second fixing member 720, and thus, the handheld device 310 does not move laterally. In embodiments, the first fixing member 710 and the second fixing member 720 may be made formed from an elastically deformable material, such that the first fixing member 710 and the second fixing member 720 cover a portion of the front surface of the handheld device 310 when the first fixing member 710 and the second fixing member 720 are impinged against the sides of the handheld device 310.

Figure 8A:
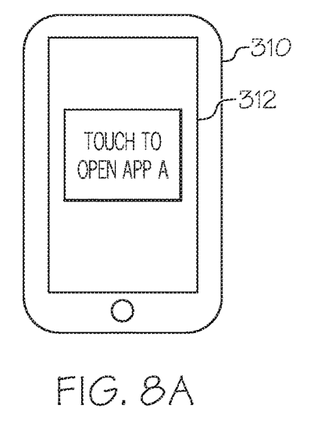
FIG. 8A schematically depicts a visual display on a handheld device placed on the instrument cluster arrangement according to one or more embodiments shown and described herein.

FIGS. 8A-8E depict various embodiments of information which may be displayed on a handheld device placed on the instrument cluster arrangement. For example, FIG. 8A illustrates the display screen 312 of the handheld device 310 when the handheld device 310 receives a signal for initiating the application program for the instrument cluster arrangement from the multimedia ECU 410. In embodiments, the display screen 312 displays a pop-up window reading "Touch to Open Application A" in response to the signal from the multimedia ECU 410. When the operator touches the pop-up window, communication between the multimedia ECU 410 and the handheld device 310 is initiated and vehicle operation information may be displayed on the display screen 312 of the handheld device 310. In another embodiment, the handheld device 310 may automatically run the application program for instrument cluster arrangement in response to the signal from the multimedia ECU 410 without displaying any message.

Figure 8B:
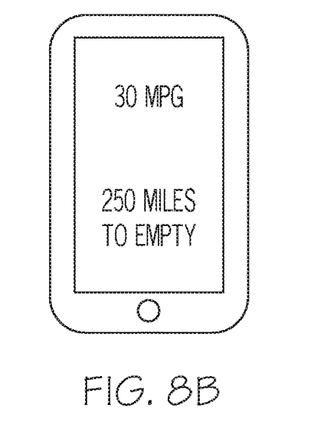
FIG. 8B schematically depicts a visual display on a handheld device placed on the instrument cluster arrangement according to one or more embodiments shown and described herein.

FIGS. 8B-8E illustrate the display screen 312 of the handheld device 310 when the handheld device is placed on the holder of the instrument cluster arrangement. FIG. 8B shows the display screen 312 displaying fuel economy information. The application program in the handheld device 310 may continuously communicate with the multimedia ECU 410 and update the fuel economy information in real time.

Figure 8C:
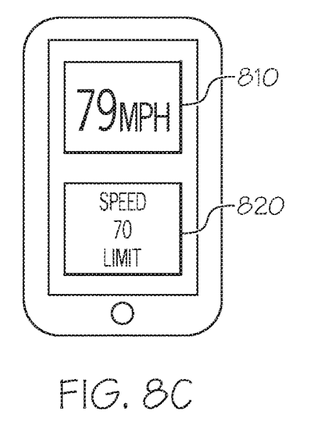
FIG. 8C schematically depicts a visual display on a handheld device placed on the instrument cluster arrangement according to one or more embodiments shown and described herein.

FIG. 8C illustrates the display screen 312 displaying a current speed of the vehicle 810 and a speed limit 820 to which the vehicle is subject to. The application program of the handheld device 310 may communicate with the multimedia ECU 410 to receive the current speed of the vehicle and display the speed on the display screen 312. In addition, the application program of the handheld device 310 retrieves speed limit information based on current location information as determined from the GPS and speed limit information from a database of speed limits indexed according to location. For example, the application program receives current location information from a GPS signal of the handheld device or a GPS signal of the vehicle. The speed limit information database stores speed limit information in association with each roadway. The speed limit information database may be stored in the handheld device 310 or in a remote server which the handheld device can access wirelessly. Alternatively, the vehicle may identify speed limit information and send the speed limit information to the handheld device 310. For example, a camera of the vehicle (e.g., forward facing camera) may capture an image of a speed limit sign, process the image to retrieve the speed limit information, and communicate the information to the handheld device.

Figure 8D:
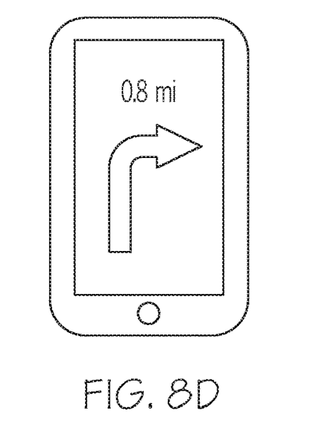
FIG. 8D schematically depicts a visual display on a handheld device placed on the instrument cluster arrangement according to one or more embodiments shown and described herein.
Figure 8E:
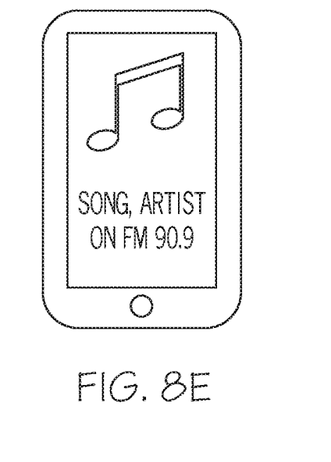
FIG. 8E schematically depicts a visual display on a handheld device placed on the instrument cluster arrangement according to one or more embodiments shown and described herein.

FIG. 8D illustrates the display screen 312 displaying navigational information. The handheld device 310 may receive a GPS signal and display navigational information based on the GPS signal. If the handheld device 310 does not include GPS functionality, it may receive a GPS signal from the multimedia ECU 410 which is obtained by the GPS antenna 420 of the vehicle. FIG. 8E illustrates the display screen 312 displaying information on media played by audio system of the vehicle. The application program of the handheld device 310 may receive the media information from the multimedia ECU 410 and display the information on the display screen 312. Alternatively, the handheld device 310 may run application for identifying music played in the background and display the identified information on the display screen 312.

Figure 9:
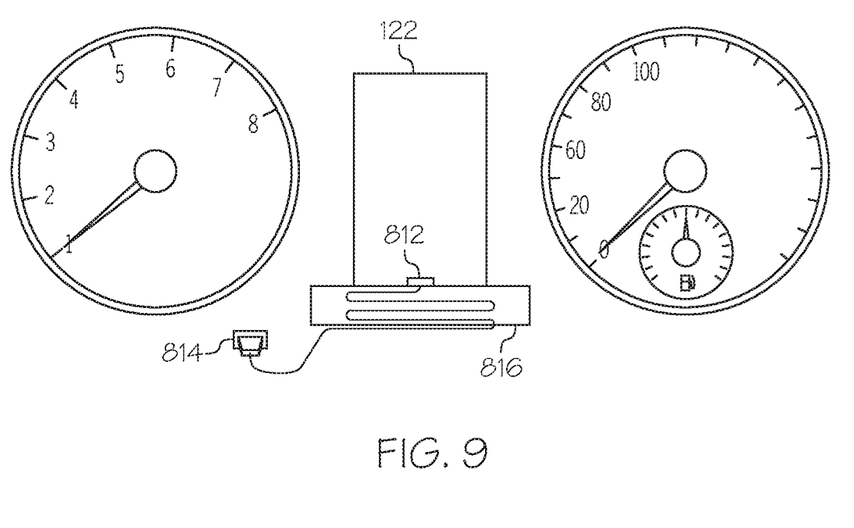
FIG. 9 schematically depicts a battery charging system for a handheld device on the instrument cluster arrangement according to one or more embodiments shown and described herein.

FIG. 9 depicts battery charging system for a handheld device on the instrument cluster arrangement. The battery charging system may include a charging cable 812, a USB receiver 814, and a tray 816. A connector of the charging cable 812 may be placed at the bottom of the holder 122 such that the vehicle operator can easily charge the handheld device when it is placed on the holder 122. The USB connector of the charging cable may be plugged into the USB receiver 814 which is connected to a power source of the vehicle and transfer power to the handheld device 310. In another embodiment, a wireless charging device may be located under the holder 122 and charge the handheld device 310 wirelessly when placed on the holder 122.

An example of the operation of the information display system will now be described with reference to FIGS. 3, 5A, 8A, and 8B. As shown in FIG. 5A, an operator of the vehicle may place the handheld device 310 in or on the holder 122 before driving the vehicle. When the sensor 130 of the holder 122 detects that the handheld device 310 is placed in or on the holder 122, the multimedia ECU 410 starts communicating with the handheld device 310 and sending information associated with the operation of the vehicle. Then, the handheld device 310 may display a pop-up window for opening an application program. When the operator touches the screen of the handheld device 310 to open the application program, information associated with the vehicle, for example, fuel economy information, may be displayed on the handheld device 310 as shown in FIG. 8B. In this regard, the operator of the vehicle can easily set up an extra display screen for the dashboard by simply placing the handheld device on the dashboard as shown in FIG. 3.

Although FIGS. 1-9 disclose embodiments of instrument cluster arrangements with two gauges, embodiments with more than two gauges or less than two gauges are included in the present disclosure. For example, only one gauge may be placed on the instrument cluster arrangement 120. In this example, the holder 122 may be placed next the gauge, and a handheld device placed on the holder 122 may be visible to the operator through the upper opening region 114 of the steering wheel 110. Alternatively, three or more gauges may be placed on the instrument cluster arrangement 120. In this example, the holder 122 may be placed anywhere between two gauges such that a handheld device placed on the holder 122 may be visible to the operator through the upper opening region 114.

The present disclosure may prevent a driver of the vehicle from distracting her views while driving by inducing the driver to put her handheld device on the dashboard area. In addition, because the display screen of a handheld device may replace a portion of the interface of a dashboard, the dashboard does not need to include a separate display screen, e.g., an LCD display screen for showing metric information, and the design of the dashboard can be simplified. Accordingly, the cost of manufacturing the dashboard is reduced substantially.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An information display system for a vehicle, comprising:
   a steering wheel comprising a ring portion and a upper opening region; and
   an instrument cluster arrangement positioned forward of the steering wheel and comprising:
      a first gauge having a first fixing member on a portion of a boundary of the first gauge; and
      a second gauge having a second fixing member on a portion of a boundary of the second gauge,
      wherein the first fixing member and the second fixing member are configured to hold a handheld device placed between the first and second gauges, and the first and second gauges are positioned such that when the handheld device is placed between the first and second gauges the handheld device is visible through the upper opening region; and
   an electronic control unit comprising:
      one or more processors; and
      a non-transitory memory storing computer readable and executable instructions which, when executed by the processors, cause the electronic control unit to communicate with the handheld device positioned between the first and second gauges to display information associated with the vehicle on the handheld device.

2. The information display system of claim 1, wherein positions of the first gauge and the second gauge are adjustable.

3. The information display system of claim 2, wherein positions of the first gauge and the second gauge are adjustable horizontally.

4. The information display system of claim 1, wherein the instrument cluster arrangement comprises a horizontal support for supporting a bottom of the handheld device.

5. The information display system of claim 1, wherein the first fixing member and the second fixing member is made of rubber or urethane foam.

6. The information display system of claim 1, wherein the first fixing member and the second fixing member cover a portion of a front surface of the handheld device when the first fixing member and the second fixing member are impinged against sides of the handheld device.

7. The information display system of claim 1, wherein the steering wheel includes one or more operator controls for sending an instruction to the handheld device.

8. The information display system of claim 7, wherein:
   the one or more operator controls is communicatively coupled to the electronic control unit; and
   the computer readable and executable instructions, when executed by the processors, further cause the electronic control unit to send a signal for changing a display mode of the handheld device in response to one of the one or more operator controls being actuated.

9. The information display system of claim 1, wherein the computer readable and executable instructions, when executed by the processors, further cause the electronic control unit to communicate with the handheld device via Bluetooth.

10. The information display system of claim 1, wherein the computer readable and executable instructions, when executed by the processors, further cause the electronic control unit to start communicating with the handheld device when the instrument cluster arrangement detects a presence of the handheld device.

11. The information display system of claim 1, wherein the computer readable and executable instructions, when executed by the processors, further cause the electronic control unit to send an instruction for operating an application on the handheld device to display the information associated with the vehicle.

12. The information display system of claim 1, wherein the instrument cluster arrangement comprises a sensor detecting a presence of the handheld device on a holder based on a signal from the sensor.

13. The information display system of claim 12, wherein the sensor is a proximity sensor.

14. The information display system of claim 12, wherein the sensor is a weight sensor.

15. The information display system of claim 1, wherein the information associated with the vehicle comprises at least one of speed information, fuel gauge information, headlight indicator information, oil pressure information, air pressure information, voltmeter information, turn signal indicator information, cruise control indicator information, fuel economy information, outside temperature information, navigation information, fuel economy information, speed limit information, and information on media.

16. The information display system of claim 1, wherein the computer readable and executable instructions, when executed by the processors, further cause the electronic control unit to send a signal for restricting a predetermined application on the handheld device when the instrument cluster arrangement detects a present of the handheld device.

17. The information display system of claim 16, wherein the computer readable and executable instructions, when executed by the processors, further cause the electronic control unit to send a signal for withdrawing the restriction when the electronic control unit determines that a speed of the vehicle is zero.

18. A vehicle comprising:
a steering wheel comprising a ring portion and a upper opening region; and
an instrument cluster arrangement positioned forward of the steering wheel and comprising:
a first gauge having a first fixing member on a portion of a boundary of the first gauge; and
a second gauge having a second fixing member on a portion of a boundary of the second gauge,
wherein the first fixing member and the second fixing member are configured to hold a handheld device placed between the first and second gauges, and the first and second gauges are positioned such that when the handheld device is placed between the first and second gauges the handheld device is visible through the upper opening region.

19. The vehicle of claim 18, wherein positions of the first gauge and the second gauge are adjustable.

20. The vehicle of claim 18, wherein the instrument cluster arrangement comprises a horizontal support for supporting a bottom of the handheld device.

* * * * *